United States Patent

[11] 3,629,829

[72] Inventor Robert Ordower
Vestal, N.Y.

[21] Appl. No. 858,253
[22] Filed Sept. 9, 1969
[45] Patented Dec. 21, 1971

[73] Assignee International Business Machines Corporation
Armonk, N.Y.

[54] CHARACTER RECOGNITION CIRCUITRY
4 Claims, 16 Drawing Figs.

[52] U.S. Cl. 340/146.3Q, 340/146.3 C
[51] Int. Cl. G06k 9/10
[50] Field of Search 340/146.3

[56] References Cited

UNITED STATES PATENTS

| | | | |
|---|---|---|---|
| 3,036,775 | 5/1962 | McDermid et al. | 340/146.3 |
| 3,103,646 | 9/1963 | Sheaffer et al. | 340/146.3 |
| 3,196,397 | 7/1965 | Goldstine et al. | 340/146.3 |

*Primary Examiner*—Maynard R. Wilbur
*Assistant Examiner*—William W. Cochran
*Attorneys*—Hanifin and Jancin and Paul M. Brannen

ABSTRACT: This invention is directed to method and apparatus for the reading and identification of characters on business documents and the like. Analog wave forms derived from scanning the characters are analyzed by integrating the signals in a plurality of time zones or divisions which span the width of the character. The integrated signals are then supplied to a plurality of correlation networks, one for each character to be recognized. The network having the highest output, as determined by maximum level detector means, represents the character which has been scanned.

INVENTOR
ROBERT ORDOWER
BY
Samuel B. Smith
ATTORNEY (PART I)

(PART 2)

| i | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 6 INPUT | +.2 | +.1 | -.4 | +1.3 | 0 | 0 | -.4 | -.2 | +.4 | +2.0 | -.1 | -.1 | -1.5 | -.1 |
| 6 NOMINAL | +.2 | -.6 | -.1 | +1.0 | 0 | -.4 | -.1 | -.1 | 0 | +2.9 | 0 | -2.8 | -.4 | -1.5 |
| 9 NOMINAL | +.2 | -.3 | -.1 | -.5 | -.1 | 0 | 0 | 0 | 0 | +.6 | 0 | -.7 | -.1 | 0 |
| 6 IN X 6 NOMINAL | +.04 | -.06 | +.04 | +1.3 | 0 | 0 | +.04 | +.02 | 0 | +5.8 | 0 | +2.8 | +.6 | +.16 |
| 6 IN X 9 NOMINAL | +.04 | -.03 | +.04 | -.65 | 0 | 0 | 0 | 0 | 0 | +1.2 | 0 | +.07 | +.15 | 0 |

CHARACTER RECOGNITION CIRCUITRY

This invention relates to apparatus and circuitry for identifying characters.

In the past, various forms of identification or reading of characters, such as the characters identifying business documents of which checks and the like are exemplifications, have been evolved. The present proposal varies from what has heretofore been done through the provision of a novel time zone integration of a magnetic ink character recognition waveform.

The invention thus tends to provide a significant cost reduction type of recognition or reading system over what has heretofore been utilized and yet the performance characteristics are comparable to those previously known.

Broadly speaking, the system is characterized by the analysis of a received signal indicative of an unknown character formation by integrating the waveforms during a plurality of time zones measured from the beginning of the waveform Following through, it becomes possible to evaluate and recognize the integrated signals by resorting to either multiplicative or subtractive correlation.

The invention can be practiced in various ways such as by magnetic character reading or by way of optical recognition where a suitable optical scanner is used. For convenience in showing one preferred form of the system it will be herein described primarily by the use of magnetic ink character recognition. In this type of operation the signal produced as input to the system is derived from a single gap magnetic head. Understanding of the operation becomes simpler when it is appreciated that the waveforms which form the input signals are generated by passing the magnetic characters beneath a magnetic pickup head. The magnetic ink characters are moved at a uniform rate relative to the gap between the pole pieces of the magnetic head. The resulting waveforms are divided into a selected number of time zones, each time zone having a width equal to the width of a single vertical line of the characters to be recognized.

Following this procedure, it is possible effectively to integrate the volt-time curves of each of the time zones of the character. The integrated signals are supplied to a plurality of correlation networks, one for each character to be recognized. The correlation network having the highest output is selected as representing the character which has been scanned.

From the foregoing, it is apparent that the invention has as one of its primary objects that of providing a simplified system and circuitry, as well as a novel method, by which characters on any form of document or support can readily be read and recognized.

Further than this, it is an object of the invention to provide a character recognition system and circuitry which has excellent ability to cope with reject and substitution errors and which can be installed at relatively low cost.

The foregoing as well as other objects, features and advantages of the invention will become apparent from the following more detailed and particular description of one preferred embodiment which the invention may assume and which is further illustrated in the accompanying drawings and broadly set forth by the claims.

In the drawings

FIG. 1 in its parts (*a*) through (*j*) represents in a schematic form one vertical stroke of the character "zero" moving relative to a magnetic pickup head element through eight different time zones;

Figure 4:
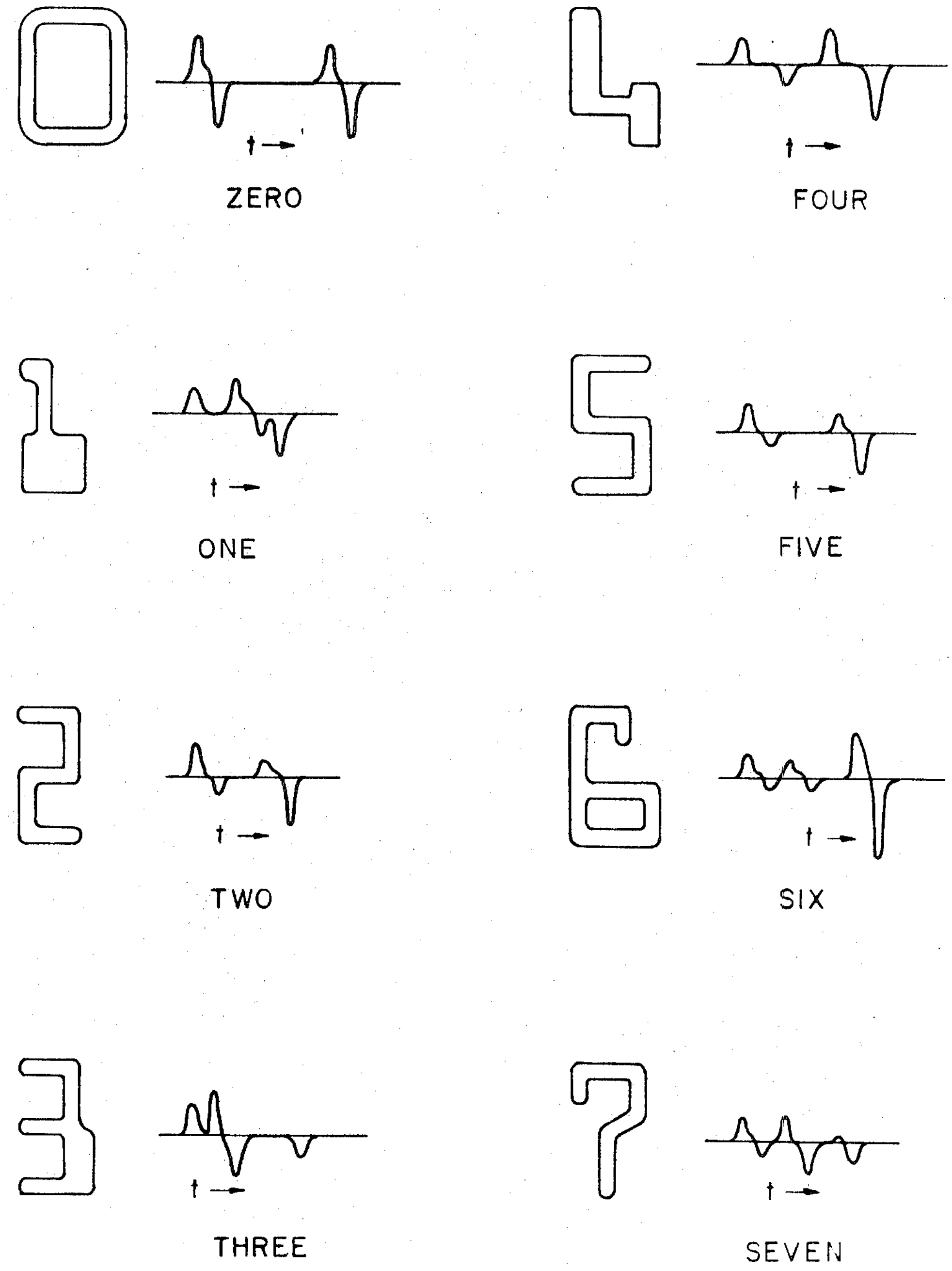
Figure 4:
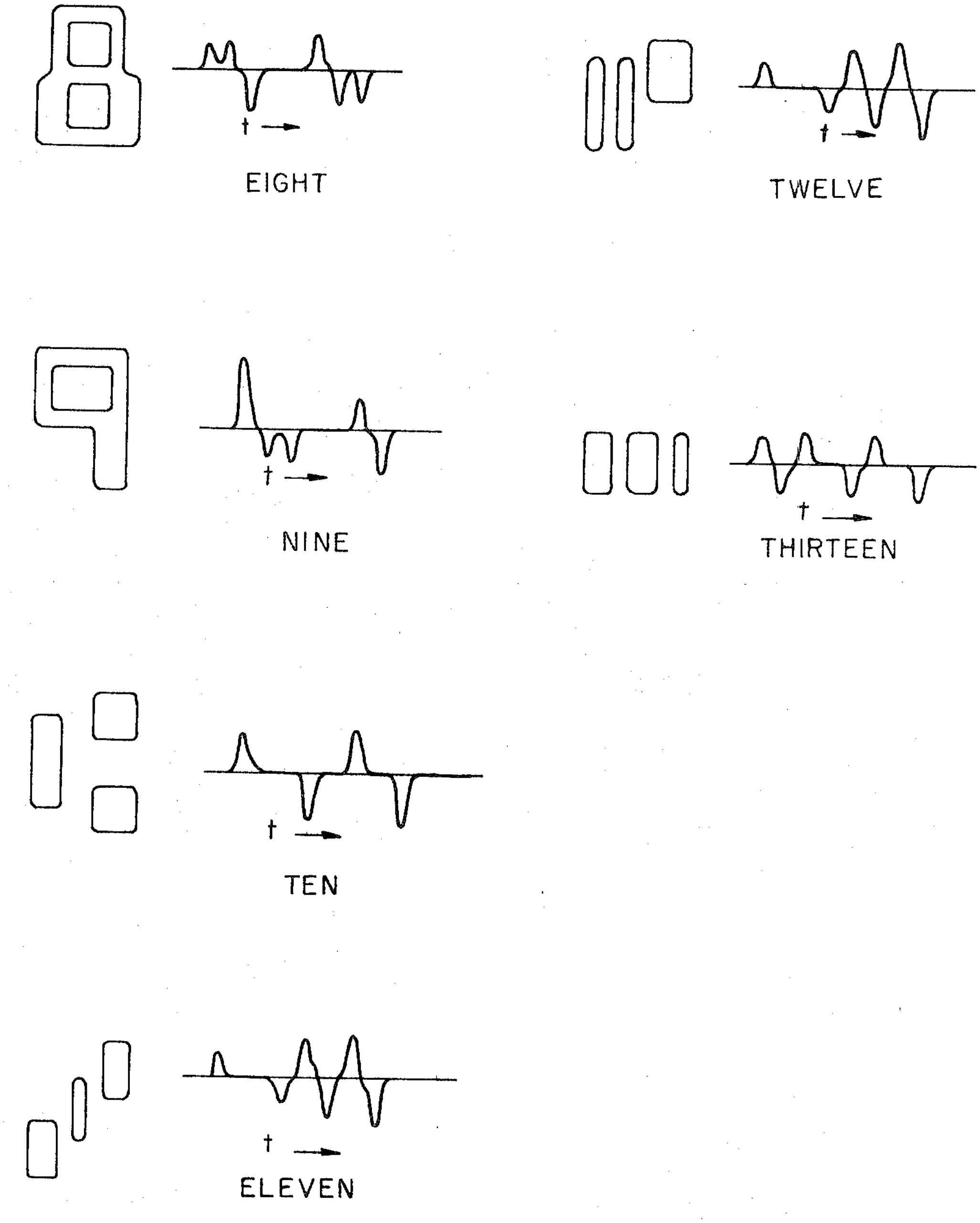
Figure 5:
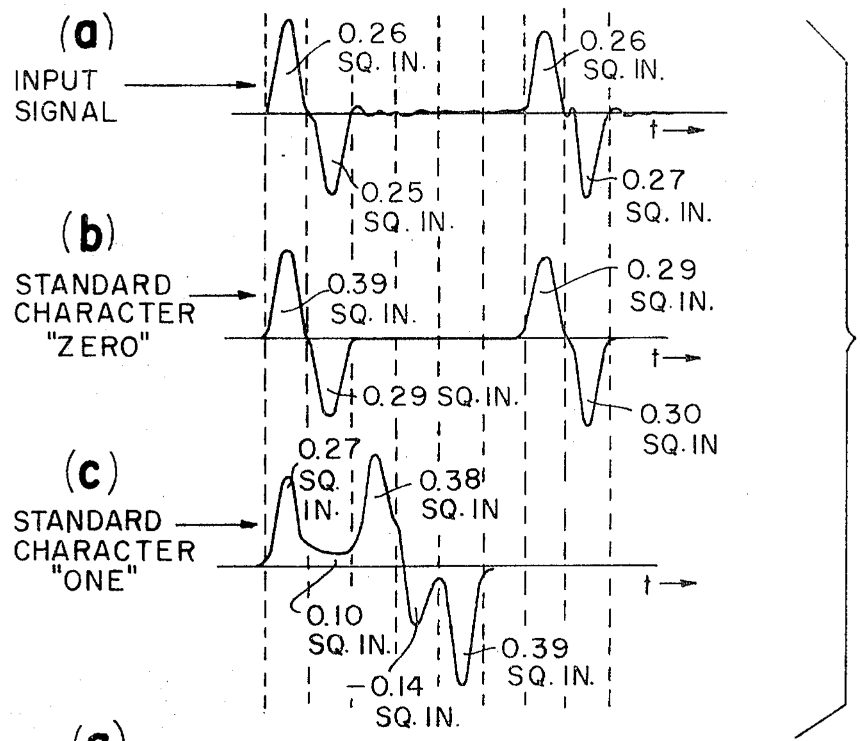
Figure 6:
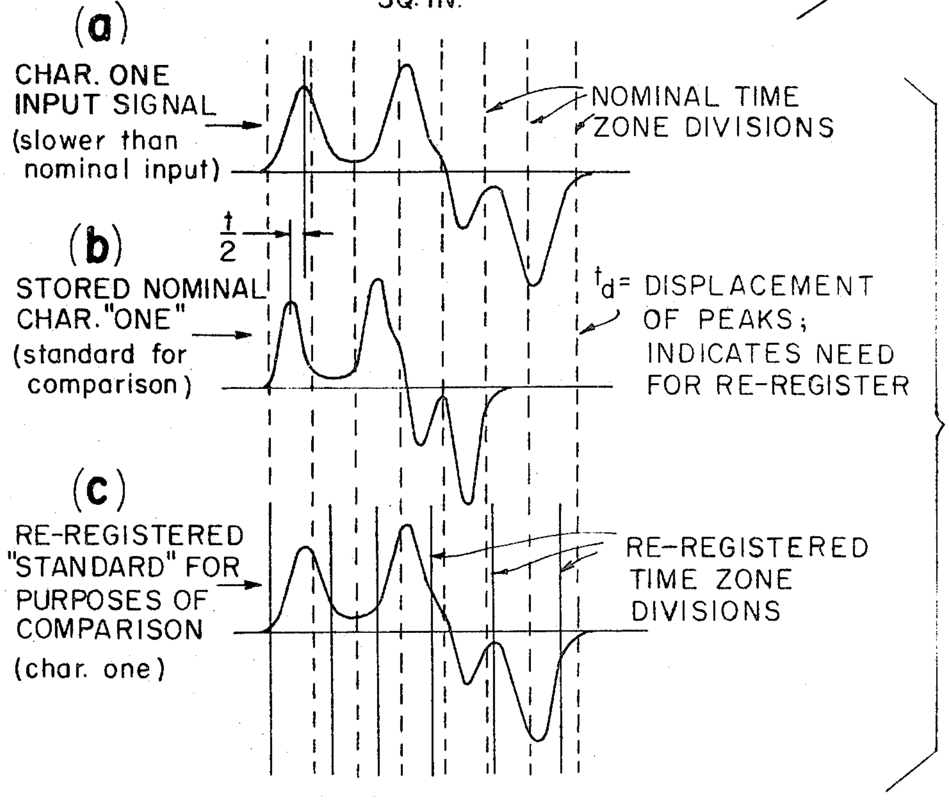
Figure 7:
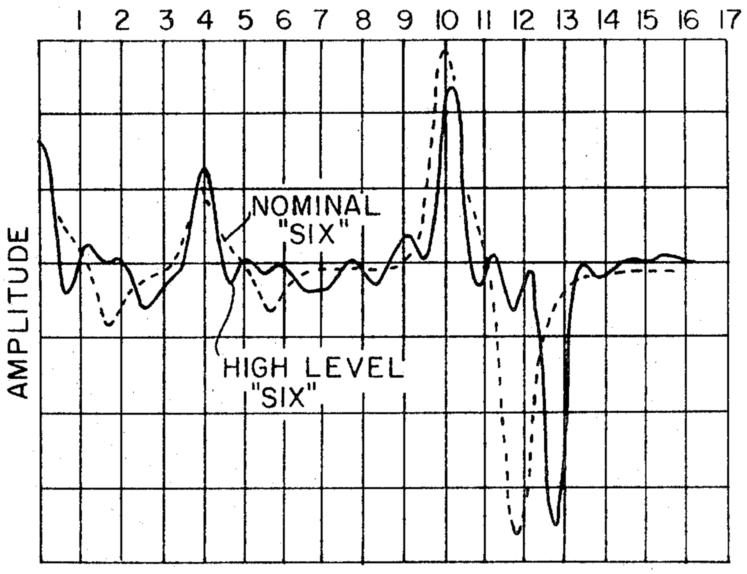
Figure 8:
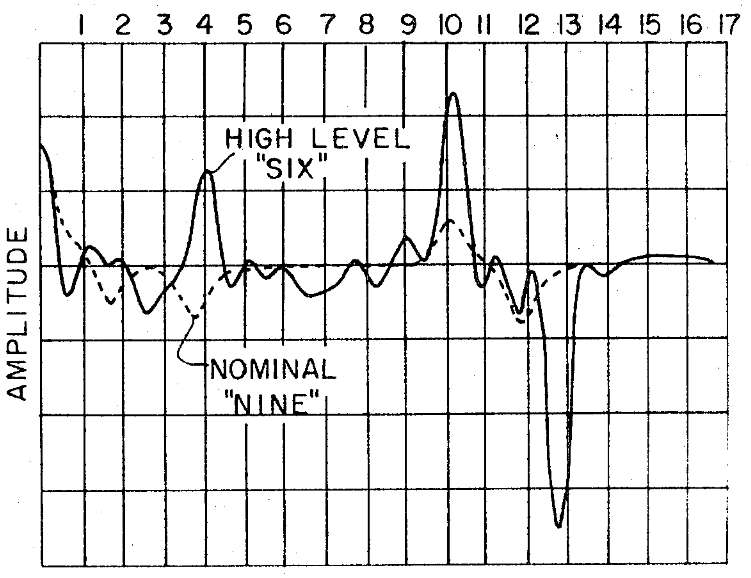
Figures 9, 13:
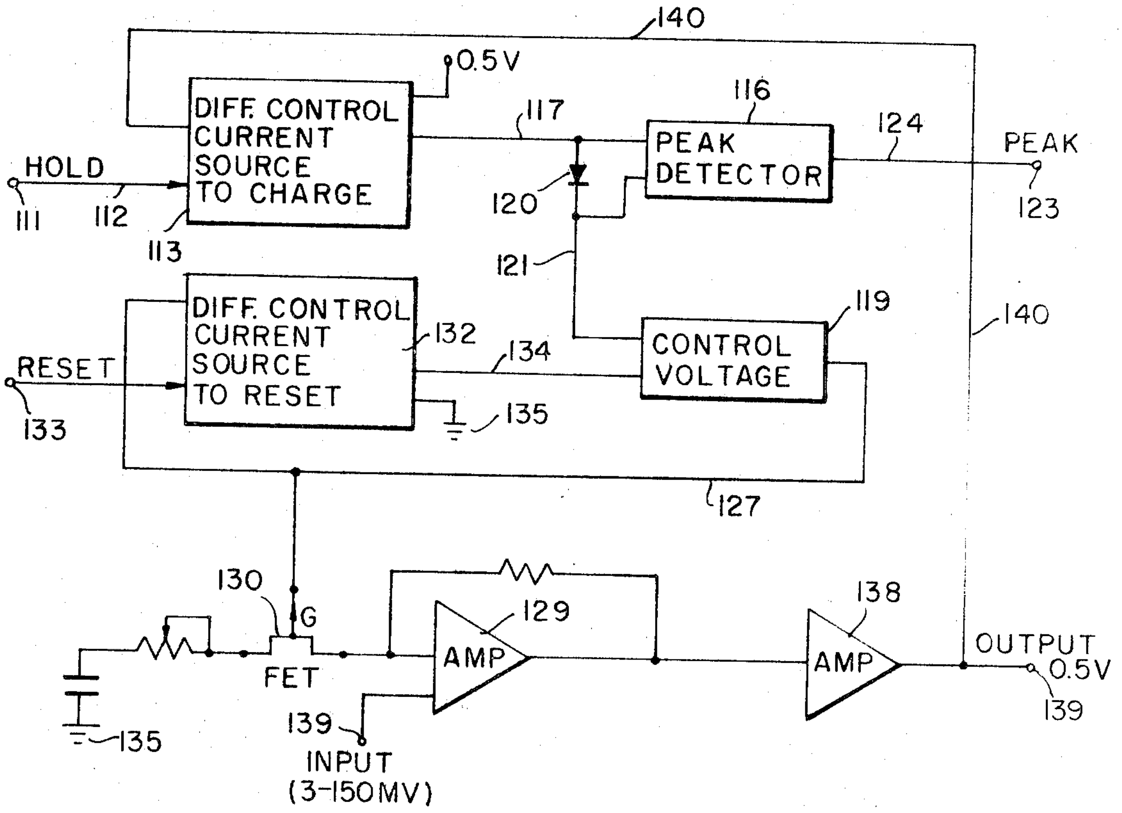
Figure 10:
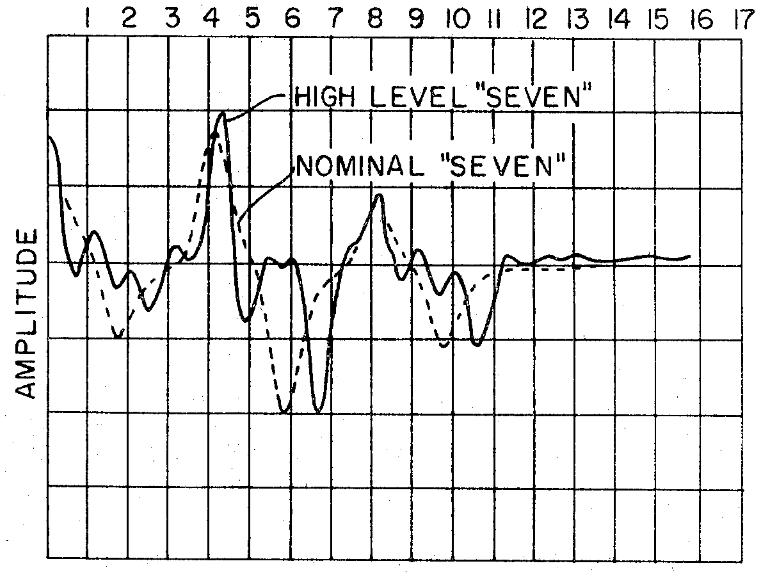
Figure 11:
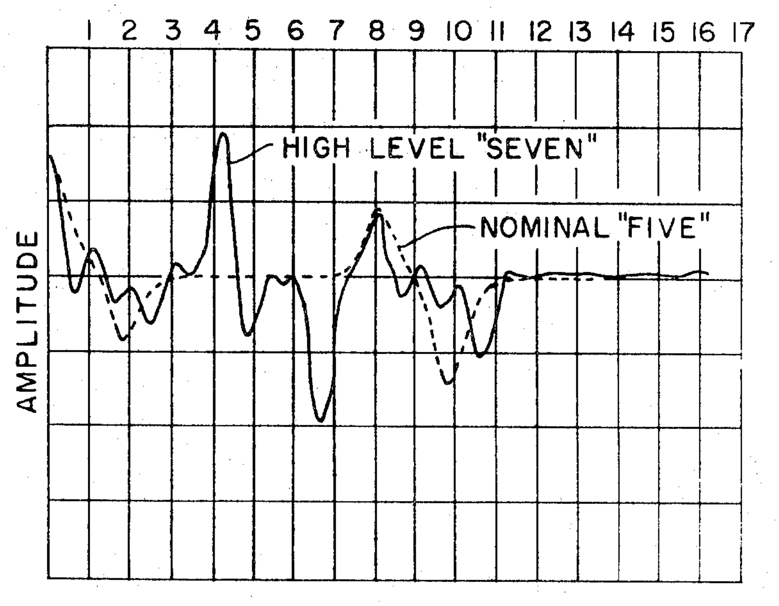
Figure 12:
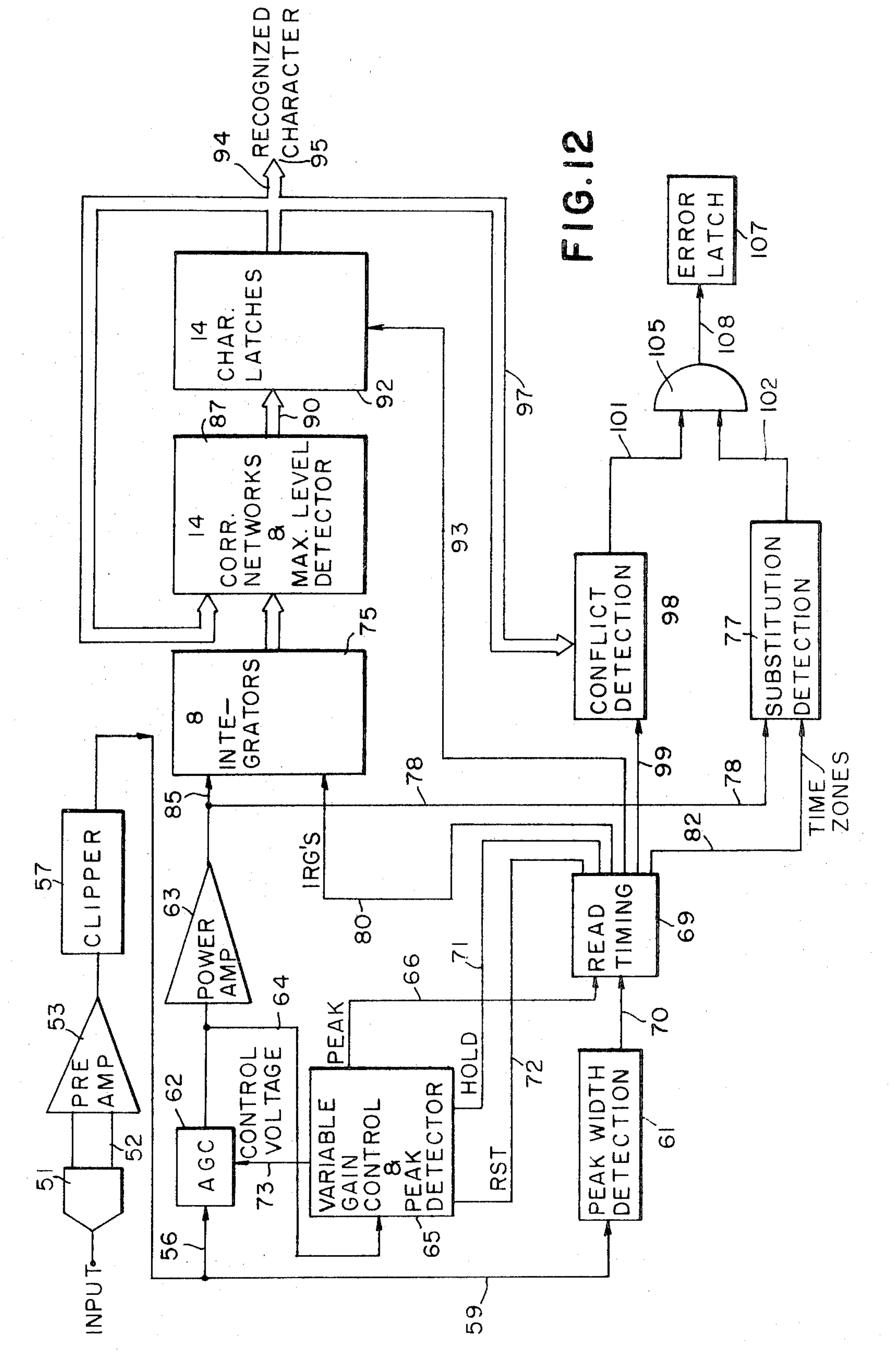
Figure 14A:
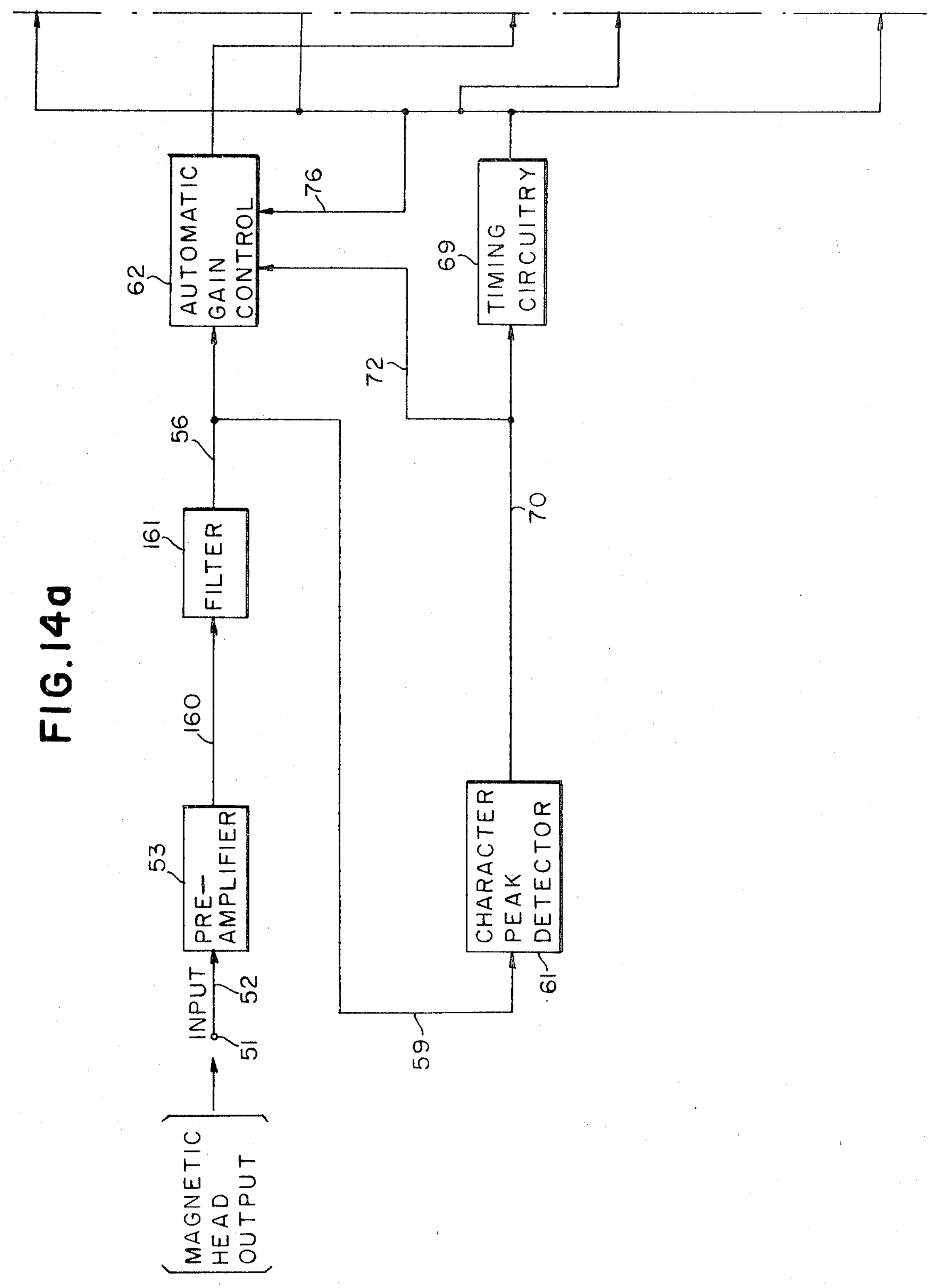
Figure 14B:
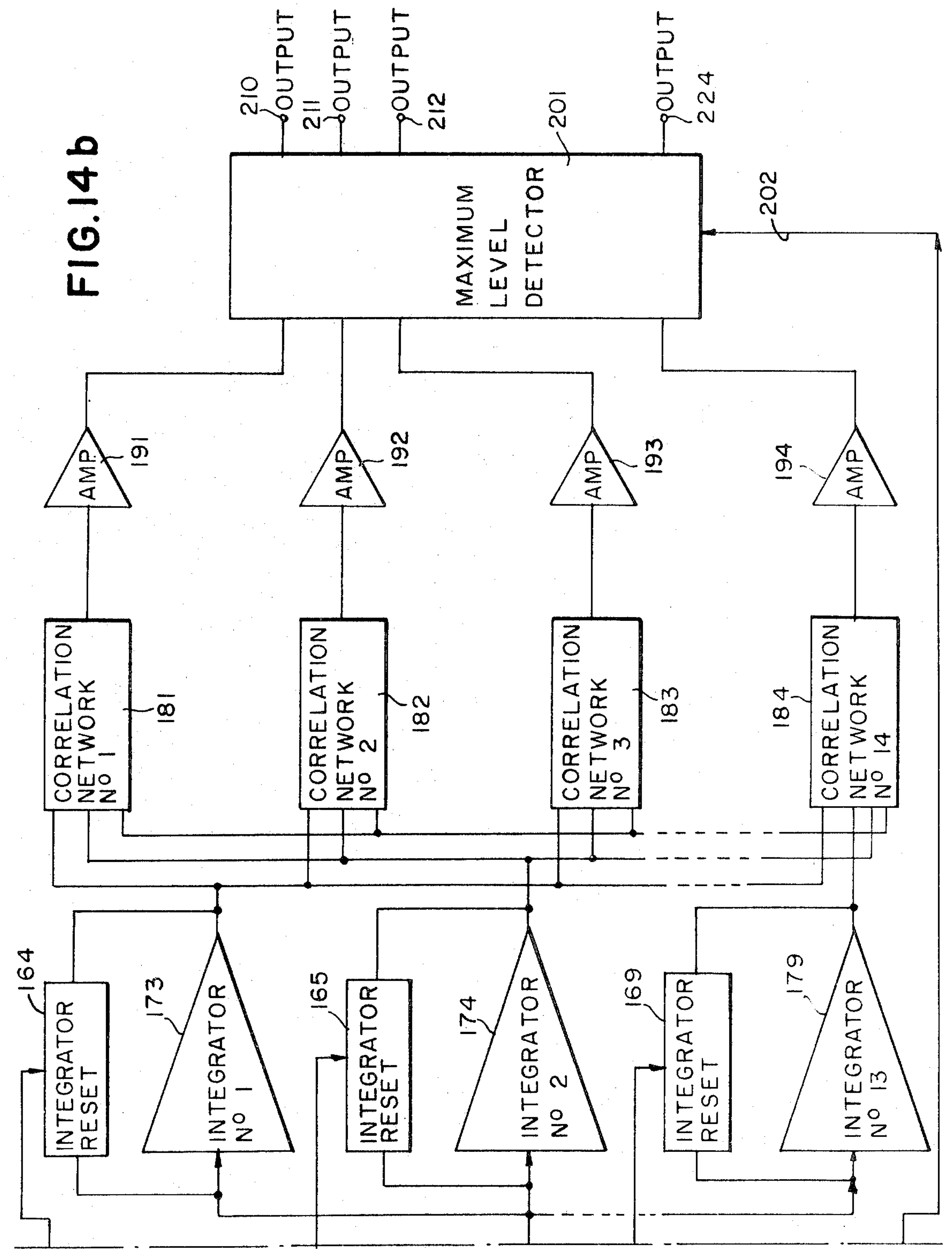

FIG. 4 in its parts (*a*) through (*n*) illustrates a selected group of 14 different stylized characters together with the waveform resulting from the scanning of such character forms by a single gap reading head;

FIG. 5 is a series of three curves which in its parts (*a*) through (*c*), respectively, represent a signal input of some assumed character which will here be illustrated as the input from scanning the character "zero" for part (*a*) and for part (*b*) the idealistic waveform which, when divided into the same number of time zones may be assumed to be a perfect signal (thus essentially a template) of the same character in a standard and known form. Part (*c*) represents the scanning wave form which would result from moving the magnetic ink characters relative to the magnetic read head if the character had been a "one" instead of a "zero";

FIG. 6 is also a series of three curves wherein part (*a*) is the waveform [similar to wave form (*c* ) of FIG. 5] which would be allocated to nominal time zone divisions if the scanned character were a "one" at a slower input rate, curve (*b*) of this figure illustrates the standard nominal characteristic or the standard for the character which would be represented by (*a*); and curve (*c*) is a registered version of the standard for the purpose of comparison with that signal shown by curve (*a*) of the figure where the input is slower than normal;

FIG. 7 represents two superimposed curves of what may be termed the nominal scanning by time zones of the character "six" which is shown in dash lines and wherein the solid line curve represents the same character scanned as a high level signal with signal level plotted against time;

FIG. 8 is a generally similar type of curve to that of FIG. 7 but illustrates the result of scanning the character "six" as the high level signal shown by solid lines and the nominal signal form resulting from scanning the character "nine" as a nominal signal and shown by dash lines;

FIG. 9 is a table to shown area calculations for the curves of FIGS. 7 and 8 and thus represents for selected time periods, in tabular form, the relationship between a nominal signal representing a "six" or a "nine" and a predetermined signal for the character "six" for the same time period divisions as well as to represent the relationship between the input and the character "six" or "nine" to achieve the proper recognition by means of the multiplicative method as compared to the subtractive method;

FIGS. 10 and 11, respectively, show in the one case the relationship between a high level and a nominal level signal if the character "seven" is being scanned and the relationship between the scanning of the character "seven" at high level and character "five" at a nominal level;

FIG. 12 is a schematic view of a magnetic ink character recognition system; in which the present invention may be employed;

FIG. 13 is a diagrammatic of one form of an automatic gain control circuit which may be used with the present invention;

FIG. 14 represents schematically by its parts (*a*) and (*b*) circuitry by which the desired overall results as herein explained may be achieved. In this figure the right end portion of FIG. 14 (*a*) is shown by the matched lines as matching with the various inputs shown at the left of FIG. 14 (*b*).

In respect of this entire analysis it may be well first to summarize some of its outstanding features. In the operation as it will be described, the read system recognizes characters by the technique of autocorrelation, using information stored on a selected number of integrators. The characters are magnetized by a suitable write head and later are scanned by a single-gap read head. The system is primarily an analog one, converting to digital only at the point when recognition is completed.

The system operation from scanning to recognition of a character can be broken down into selected different segments. These may be (*a*) the signal pickup which is usually achieved with a suitable preamplifier, a filter, an AGC, and a power amplifier.

Following this there is normally an Information Storage component. This component by the recognition technique employed in this system segments the character waveform into seven equal time zones, starting one-half of a time zone after the first peak, as will be further explained. Recognition of a waveform requires information relative to the amplitude and polarity of the signal in each time zone. This information is obtained by integrating the waveform for each zone.

The read cycle begins with detection of the first peak by a peak detector. After a one-half time zone delay a timing ring is started which controls division of the character into time zones by generating, in the assumed example, of seven integration intervals. The first integrator integrates over all seven time zones, the second integrator integrates over the last six time zones, and so on. The value of the integral for the first time zone is obtained by subtracting the level stored on the second integrator from the level stored on the first integrator. The eighth integrator is required to determine the value of the integral for the seventh time zone.

Following this there is a Signal Recognition component. This element functions at the end of the seventh integration interval when all the information required for recognition is stored on the integrator capacitors. The information is analyzed by correlation techniques consisting of correlation networks and maximum-level detectors) to determine which one of the 14 possible characters (which will later be described particularly by FIG. 4) was read.

In Digital Readout circuitry the correlation technique used for identification of the signal requires a special circuit which can detect the highest in a group of the assumed 14 voltage levels and indicate digitally the character to which this level corresponds. This special circuit is referred to as the Maximum-Level Detector (MLD) and can be of a number of well-known varieties.

The practical Conditioning of Recognition requires some checking procedures to validate the results of the correlation process.

The MLD (as above noted) has two built-in checks, namely, requirements that the highest level exceed a fixed lower level and that it exceeds the second-highest level by at least 10 percent of its own magnitude.

Next, there must be a consideration of how the scanned character is recognized. Recognition is accomplished by a waveform matching technique based on the autocorrelation and cross-correlation functions of statistical mathematics, which give a maximum value for the condition of best match. Each waveform of the selected 14 characters can be divided into a selected number of equal time zones (such as seven) so that it may be mathematically defined as a vector with a number of components equal to the number of time zones whose coefficients are determined by the signal content in the time zone. Thus, for the purposes of this discussion, each character waveform will be represented as a vector of seven components.

If $a_1, a_2 \ldots a_n$ are the numbers of one set and $b_1, b_2 \ldots b_n$ are the numbers of another set, then the coefficient of correlation between the two sets is, by definition, $$\Omega = \frac{\sum_{i=1}^{n} a_i b_i}{\sqrt{\sum_{i=1}^{n} a^2_i \sum_{i=1}^{n} b^2_i}} \qquad (1)$$

Mathematically, $\Omega$ may be interpreted as the cosine of the angle between two n-dimensional vectors $\overline{A}$ and $\overline{B}$, where $a_1, a_2 \ldots a_n$ and $b_1, b_2 \ldots b_n$ represent their respective components. The numerator of equation 1 is equivalent to the dot product of the two vectors A and B, and the denominator of equation 1 is equivalent to the product of the magnitude of the two vectors. Thus, equation 1 can be rewritten as:

$$\frac{\overline{A}\cdot\overline{B}}{AB} = \frac{AB \cos}{AB}\theta = \cos\theta \qquad (2)$$

where $\theta$ is the angle between the two vectors. Inspection of equation 2 indicates that $\Omega$ is greatest when $\overline{A}$ and $\overline{B}$ are the same vector; that is $\theta = 0°$ and $\cos\theta = 1$. This is the manner in which waveform comparison is accomplished in this recognition system. The input waveform may be represented by a vector $\overline{X}$, such that, $$\overline{X} = X_1, \overline{Z}_1 + X_2\overline{Z}_2 + \ldots + X_7\overline{Z}_7$$

where $X_1, X_2 \ldots X_7$ are the areas under the waveform in certain selected time zones $Z_1, Z_2 \ldots Z_7$ respectively, (see FIG. 3) which are stored by the integrators. The outputs of the eight integrators (eight integrators are required as per the illustration proposed) comprising $\overline{X}$ are fed into 14 different correlation networks, which store vectors corresponding to the 14 character waveforms. The stored vectors are of the same form as $\overline{X}$, except that the coefficient are derived from known waveforms and include a weight factor which is equivalent to the magnitude of the associated vector. The correlation network functions can be expressed then as $\overline{A}n/_{A_n}$ for the $n$th character; therefore, $\overline{X}$ which can correspond to one of the 14 characters will cause the output of that particular network to be maximum. To prove this, let $V_1$ and $V_2$ be the outputs of networks designed for vectors $\overline{A}_1$ and $\overline{A}_2$, respectively. Assume that the unknown vector $\overline{X}$, is identical to $\overline{A}_1$, then:

$$V_1 = \frac{\overline{X}\cdot\overline{A}_1}{A_1} = \frac{\overline{A}_1\cdot\overline{A}_1}{A_1} = A_1^2 \cos\theta 11 = A_1(\theta_{11} = 0°)$$

$$V_2 = \frac{\overline{X}\cdot\overline{A}_2}{A_2} = \frac{\overline{A}_1\cdot\overline{A}_2}{A_1} = \frac{A_1A_2\cos\theta 12}{A_2} = A_1\cos\theta 12$$

and since $A_1$ and $A_2$ are not identical, the angle between them, $\theta$ 12, cannot be zero, thus $\cos\theta\, 12 < 1$ and $V_1 > V_2$.

With the foregoing considered, it is now desirable to consider the functional parts needed for the system. When the input signal waveform is developed in any desired fashion as by single gap scanning it is desirable that it first be supplied to suitable preamplifier and clipper. This unit may be a differential amplifier with high common-mode rejection and adjustable gain to compensate for parameter variations in the entire front end. Nominal gain can be approximately set. Input signals also range rather widely. The output of the preamplifier is limited by a clipper which may be in the form of back-to-back diodes to ground. From this point the signal is usually sent through a suitable low-pass filter.

Following this is an automatic gain control (AGC) which can assume a variety of known forms, and preferably incorporating a peak detector.

There is then a peak-width detector including a maximum level detector which is used to amplify the signal a selected number of times and simultaneously provide a digital indication of the base width thereof. The digital output of this MLD is fed to a delay circuit whose output will switch only if the base width of the signal is longer than the delay time out period. The output of the delay switching sets a latch which permits peak detection. This circuitry establishes a requirement for the minimum base width of valid signals. Signals of base width below this minimum, regardless of amplitude, will be ignored by the peak detector.

A power amplifier can then be used with its power output stage arranged to supply an output at a selected voltage and circuit rating to the eight integrators and the substitution detection circuits.

The read timing begins with the output of the peak detector going first negative and then positive. This action causes the firing of a read delay which turns on a read trigger. The read delay provides a one-half time zone delay before the read trigger turns on a read oscillator. The read oscillator drives high- and low-order timing rings which are decoded to give the assumed eight integration intervals, control pulses to the MLD, hold and reset signals for the AGC and other "-housekeeping" functions.

Operational amplifiers with appropriate scaling components may be employed as integrators. In this type of operation it is desirable to include bidirectional transistor switches to reset the integrator capacitors. The switches are controlled digitally by the read timing and a down level turns the switch on.

The correlation networks comprise suitable networks of precision resistors. The minimum level detectors (MLD) connected to the correlation networks serve two purposes, one of which is that they serve as operational amplifiers with the correlation networks as scaling components to compute the algebraic sum of products, $(\bar{X}\cdot A_n)$. The other function is that the end result of the product of the input waveform (vector) with the correlation network vector is a set of 14 analog voltages present on the output of fourteen MLD's. Actually, the analog outputs of all the MLD's are tied together forming a positive "or," such that the output follows only the most positive input. In the preferred form of circuitry each MLD includes a detector stage whose digital output indicates whether or not the amplifier is "on"; that is, its input is controlling the "or" output because it is the largest. Thus, the MLD provides a digital indication of which stored waveform compares best with the input waveform. At the end of the read cycle the digital outputs of the MLD's are gated into character latches and the recognition cycle is complete.

A 15th MLD whose input is tied to a small positive DC voltage (approximately 0.5 volts) is included in the "or" circuit which limits recognition to waveform comparisons which yield positive voltages above this voltage referred to as the "failure level."

Ordinarily only one digital output of the assumed 14 MLD's will be on for a particular input, since the MLD's are capable of sensing differences of 20 mv. or less. It is not, however, desireable to make positive recognition of waveforms which compare so closely to two or more of the stored waveforms. A requirement for recognition is established that the second-highest MLD output does not exceed 90 percent of the highest output.

The MLD is preferably so designed that by means of a digital control pulse, its gain can be reduced by 10 percent. At the end of read cycle, a control pulse is applied to the MLD that is on to reduce its gain and presumably the output of the "or" circuit by 10 percent. If another MLD output was within 90 percent of the highest MLD output, it will turn on and an error condition will exist. The MLD signal outputs are fed into a majority-logic element whose output indicates a condition of one and only one drive for an 14 inputs. The output of this circuit is gated into the "error latch" during the time of conflict detection. This latch being on indicates a failure to properly recognize.

Improper registration or gross distortions of the input waveforms can cause an incorrect identification or a substitution. This happens mainly because recognition by this system is based on a comparison of DC voltage levels which could be produced by any number of inputs. There are no requirements that the waveforms themselves, rather than their energy content, must meet.

To cope with this situation circuitry has been added to provide information relative to the signal content on a time zone basis. A set of four comparators is used to detect peaks of various levels as the character is being scanned. The outputs of these comparators are gated into latches on a time zone by time zone basis. At the end of the read cycle the state of the latches is compared with the character recognized and any discrepancy sets the error latch. For example, if the waveform were recognized as an "0," and a latch was on that indicated a peak was in time zone 3, that character would be rejected.

Figure 1:
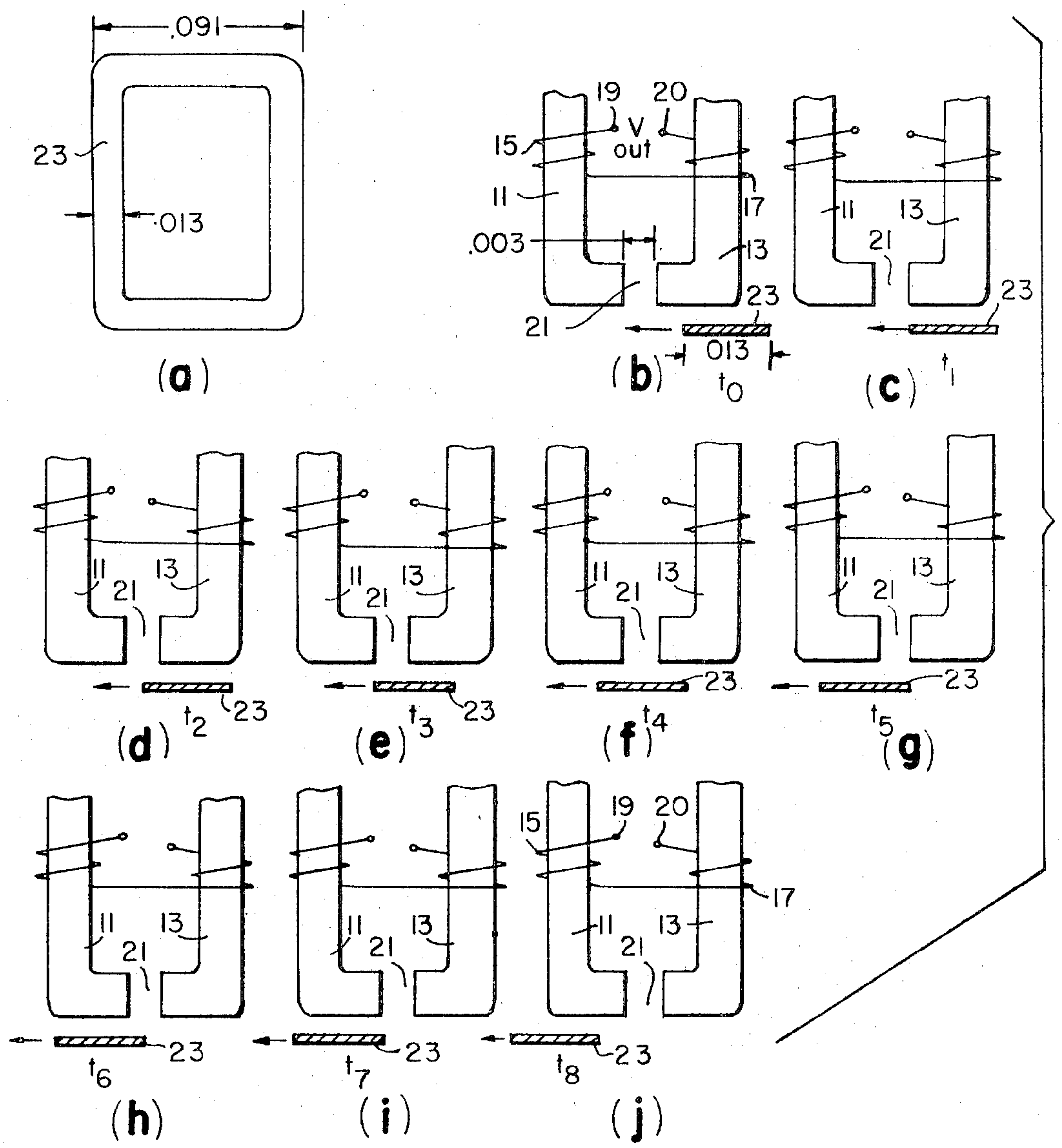

If reference is now made to the drawings in order to have a better understanding of the invention, full appreciation may be had of the waveforms which are generated when, for illustrated purposes, it can be assumed that a magnetic character is passed beneath a magnetic pickup head. Referring to FIG. 1, part (*a*) shows the vertical bars 23 of an assumed character "-zero" as being about 0.013 inches wide and the complete character as about 0.091 inches wide. In part (*b*) there is exemplified in schematic form pole pieces 11 and 13 of a magnetic read head having windings 15 and 17, respectively, thereabout, with the windings serially connected and leading to terminals 19 and 20. These terminal points make the output signal from the pickup available for investigation and may be considered to provide an input signal to some form of circuitry such as that shown by FIG. 12, and which will later be explained.

For illustrative purposes, the gap 21 between the lower ends of the pole pieces 11 and 13 may be assumed to be very small and illustratively about 0.003 inches. It will be noted that closely adjacent to the gap there is shown in FIG. 1*b*, a strip 23 having a width of 0.013 inches, which will correspond to that assumed for one of the vertical bars 23 of the character "zero" shown in part (*a*) of this figure. Considering now that the portion 23 of the character moves from right to left, as indicated by the arrow, the time condition represented by the left portion of the figure is shown as $T_0$. However, as the character strip 23 continues its motion from right to left and reaches the edge of the pole piece 13 the elapsed time is now $t_1$ as in FIG. 1*c*. Continued motion of the character section 23, as in FIG. 1*d*, shows a condition at time $t_2$ when the left edge of the character strip 23 is about midway between pole pieces 11 and 13, and covers approximately one-half of gap 21. Further motion from right to left, as represented by the showing of FIG. 1*e*, shows that the character line portion 23 spans the entire gap 21 at a time period $tt_3$. The same condition obtains at time $t_4$, as shown by FIG. 1*f* of this figure, and continues through to time $t_5$, as shown by FIG. 1*g*. This is because the line of the character is beneath the pickup head gap but at the instant the line width 23 has moved approximately to the edge of the pole piece 13 any further motion uncovers a portion of the gap 21 between the pole pieces 11 and 13, as depicted by FIG. 1*h*.

This uncovering action continues with movement of the line strip 23 until a time period shown at $t_7$ FIG. 1*i*, where the right edge of the line strip is a line with the edge of the pole piece 11. Continued motion, of course, moves the magnetic ink character beyond the gap between the pole pieces so that it is at the opposite side of the gap from that shown in FIG. 1*b*. This occurs at the assumed time period $t_8$, FIG. 1*j*.

Figure 2:
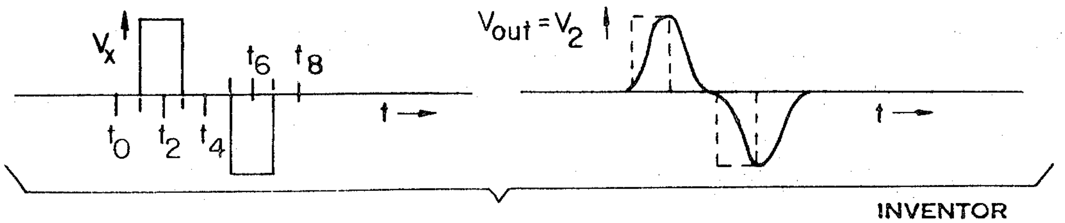
FIG. 2 represents the idealized and actual output of the magnetic head when one vertical stroke of character "zero" is moved relative to it as shown in FIG. 1.

Actually, the magnetic head performs some filtering action as relative motion between the magnetic ink character occurs. If this were not the case, the output voltage as available at terminals 19 and 20 would be simply the derivative of the magnetic flux which links the coils of the head. This ideal type of output is shown by the left-hand curve of FIG. 2 where the ordinate values represent voltage and the abscissa values represent time. The filtering action, however, of the head rounds off the corners of the characters formed and the fringing effects of the pickup head causes the wave form to be shaped more as shown by the solid line curve on the right-hand of FIG. 2. This is the type of scanning operation that one can expect and the type of wave shape change that naturally results.

For the purpose of further understanding this invention FIG. 4, parts 1 and 2, show the magnetic character strokes for the character "zero" as well as "one" through "nine" and codified characters "ten" through "thirteen," and opposite each is a generally schematic showing of a single gap wave form for each character.

Each of the magnetic ink characters and its associated signal may be divided into a number of time zones with the width of each time zone being equal to the width of a single vertical line of a scanned character.

Figure 3:
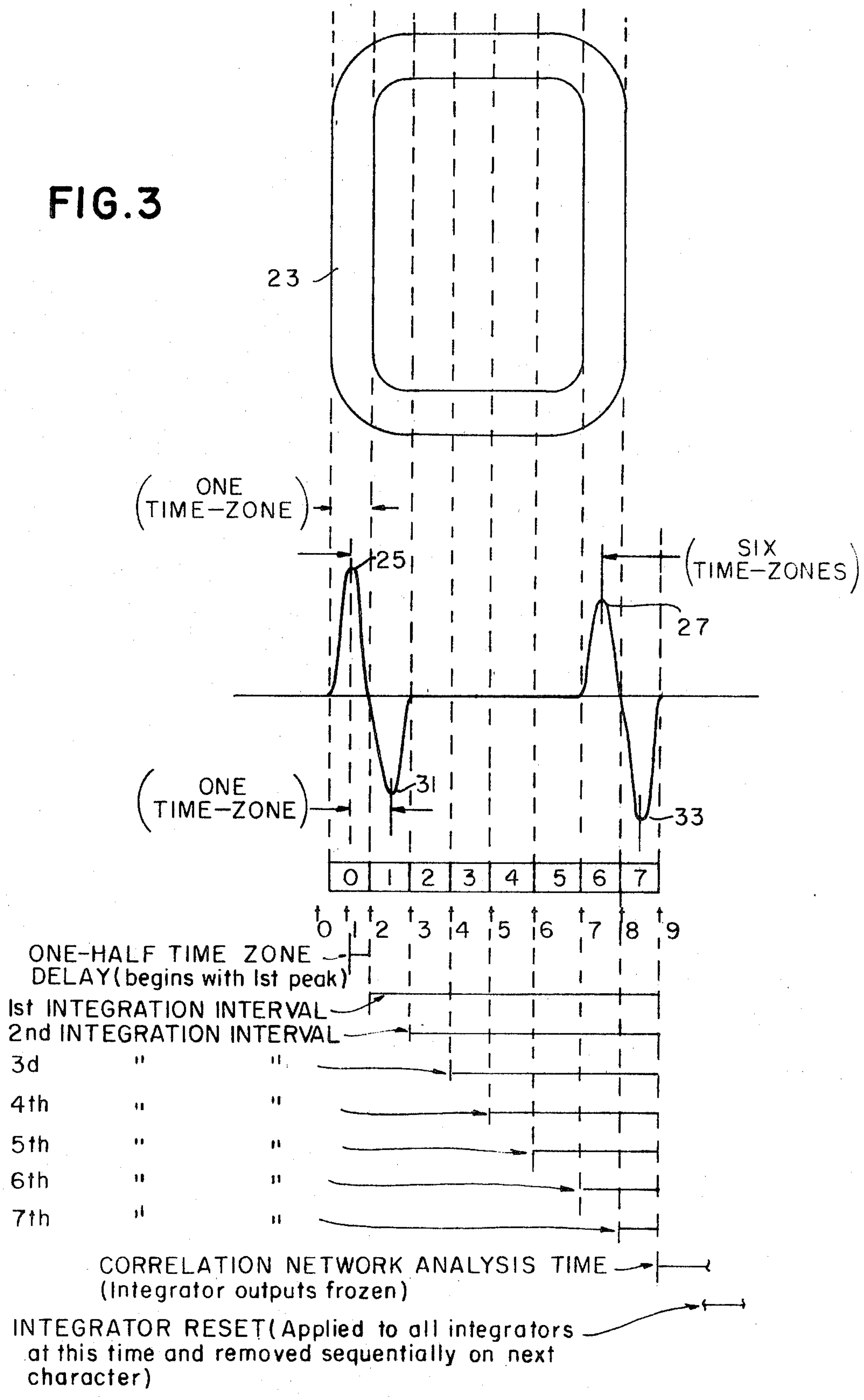
FIG. 3 illustrates the division of the character, zero into time zones of equal length the relation of these zones to subsequent recognition functions.

An example of this time zone division is found in the showing of FIG. 3 where the different time zones are represented by the dash lines extending in a vertical direction. The showing in FIG. 3, again, is for the character "zero" as illustrative of one form of character which generally can be seen in its entirety in FIG. 1*a*. Here it may be noted that the positive peaks 25 and 27 of the signal are always spaced at some multiple of the time zone width. For a character of nominal total time zone width, any variation in line width will cause the negative peaks such as 31 and 33 to shift with respect to the positive peaks.

Usually, the magnetic ink signals pass near or cross through a zero signal level at some multiple of a time zone width as can be recognized in FIG. 3. When the area beneath the volt-time curve in each time zone for a particular input signal is known, it is possible to compare these time zone areas to the calculated time zone areas of the assumed fourteen standard characters and then determine readily which character is most closely identified by the input signal.

There are two methods by which this comparison may be achieved. One method involves subtracting the areas of the input signal curve from that of each character, time zone by time zone, and adding the absolute value of each difference for each character. If this scheme is followed, the character whose comparison gives the minimum sum is chosen as being associated with the input signal. The second method involves multiplying the area of the input signal by that of each character again doing so time zone by time zone and then algebraically summing the multiplications for each character. In this instance, the character whose summation is a maximum is chosen as the recognized character.

In any practical system there are certain other considerations that must be met. Threshold and other recognition statements have been provided in the hardware to further improve the practical performance. But the principle upon which this invention was based will first be dealt with and then the refinements.

An example would be that which has been depicted here by the various curves (*a*), (*b*), and (*c*) of FIG. 5, and the notations of areas marked thereon. In the present example, weighting filters, thresholds and other statements have not been included for purposes of simplification. Assuming, for instance that the areas are as shown, the input signal might be that depicted by curve (*a*) to be compared with a standard character "zero" curve which is shown by curve (*b*) and with curve (*c*) which shows a standard character signal for a "one." For this condition and neglecting the first peak of each signal, the two methods may be described as follows:

DETERMINING CHARACTER ASSOCIATED WITH INPUT SIGNAL:

(a) SUBTRACTIVE METHOD (NEGLECT FIRST PEAKS):

$$\text{ZERO} => |.29-.25|+|.29-.26|+|.30-.27|=\underline{0.10}$$

$$\text{ONE} => |.10-.25|+|.38-.00|+|.14-.00|+|-.39-.00|=\underline{1.06}$$

CHOOSE MINIMUM SUM=>CHOOSE ZERO (b) MULTIPLICATIVE METHOD (NEGLECT FIRST PEAKS):

$$\text{ZERO} => (-.29\times-.25)+(+.29\times.26)+(-.30\times-.27)=\underline{.2290}$$

$$\text{ONE} => (+.10\times.25)+(+.38\times.00)+(-.14\times-.00)+(-.39\times.00)=\underline{-.02}$$

CHOOSE MAXIMUM SUM=>CHOOSE ZERO

Either the subtractive or the multiplicative method can be selected. However, for the purpose of this description, reference will be made to the multiplicative method as being the preferred way of practicing this invention. This choice is made because of the hardware involved and because of cost considerations from which the investigations so far made indicate a greater simplicity in implementing the multiplicative methods rather than the subtractive methods.

It can be seen from following the curves of FIG. 6, for instance, that curve (*a*) represents the character "one" where there is a slower than normal input. Here again, the normal or nominal time zone division is shown by the vertical dash lines extending between all of the various portions of the figure. In the second curve there is shown the waveform for a nominal character "one" which is actually the standard for comparison but, as can be recognized, there is a relative displacement by some time period represented by the delay introduced by the peaks of curve (*a*). This immediately indicates that there is a need for reregistration of the signal with respect to the so-called standard if an accurate comparison is to be made. Under the circumstances, the curve shown by portion (*c*) of FIG. 6 is a registered standard which now can be compared with delayed curve shown by FIG. (*a*) of the figure.

Utilizing the subtractive method, the minimum signal output is chosen for the identification, but with the multiplicative method the maximum is chosen, and this will be apparent from a further inspection of the curves of FIG. 5 wherein there is an indication of the area of the different parts of the curve above and below the zero line.

Some of the errors in character recognition arise as a result of printed line width variations. These variations constitute a known problem in previous recognition systems. The time-zone to time-zone techniques were found to reduce the resulting errors substantially. The registration as depicted in FIG. 6 shows that when the signal received is slower than the nominal or prerecorded input which is used as a standard of comparison, the peaks of the signals are always displaced relative to the standard. Registration by time-zone divisions for the purpose of comparison then becomes desirable. This has been implemented in the hardware.

Consideration may be given now to the curves of FIG. 7 where an assumed form of input wave which might be representative of the character "six" having wider than nominal line widths is shown. The wide line widths shift the negative peaks to the right. The statistical average or nominal waveform for this character, to which the input is compared, is also shown in this figure, but designated by the dash line.

If a subtractive system were to be employed, the absolute value of the differences of the areas of the two waves in each time zone would be integrated to find the resultant. However, here it can be seen that the final large negative peaks are quite substantially misaligned due to the line width variations. Consequently, the integrated value would be quite large when, for purposes of recognition, it should be a minimum value. Considering jointly with FIG. 7 the curves of FIG. 8, the input for a high level "six" is compared with the nominal value for a "-nine." In this case the integrated value is smaller than the previous comparison which of course results in an error and shows as either a conflict or a substitution. When the comparisons are made on a time-zone to time-zone basis, as represented by FIG. 9, proper recognition for the input signal as being "six" is made possible.

In FIG. 9 the table gives substantially the conditions for the input signal as well as the nominal or prerecorded signal of six and none as well as the showing of the conditions for multiplicative and subtractive methods of identification. These methods produce results which illustratively may be tabulated as follows:

(a)

$$\sum_i (6\ \text{input}_i \times 6\ \text{nominal}_i) = +8.27$$

$$\sum_i (6\ \text{input}_i \times 9\ \text{nominal}_i) = +.77$$

Proper Recognition For "Multiplicative Method"

(b)

$$\sum_i |6\ \text{input}_i - 6\ \text{nominal}_i| = +4.2$$

$$\sum_i |6\ \text{input}_i - 9\ \text{nominal}_i| = +3.2$$

$$0.9\times4.2=3.78<1.2(\text{weight})\times3.2<3.84$$

Conflict For "Subtractive Continuity

FIGS. 10 and 11 are further illustrations of "ringing" produced by high level input signals resulting from excessive line widths, and show how a "five" may be substituted for a "-seven" if time-zone to time-zone comparisons are not performed.

Before considering the complete system, as diagrammatically shown by FIG. 14 it may be helpful to note first FIG. 12. In this figure the input signal is supplied at 51 and fed by conductors 52 to a preamplifier 53, and, if desired, a filter such as shown at 35 in FIG. 14. The signal then is clipped, as already explained, in clipper 57 from which it is supplied by conductor 59 to a peak width detector 61 and by conductor 56 to the automatic gain control 62.

The automatic gain control 62 energizes a power amplifier 63 and supplies one input by conductor 64 to a variable gain control and peak detector 65. This unit has a peak output on conductor 66 supplied to the read timing or clock unit 69, which also receives an input in conductor 70 from the peak width detector 61. The read timing unit 69 has numerous outputs. Two of these outputs are in conductors 71 and 72 to provide a hold signal and a reset signal respectively to the variable gain and peak detector 65 which supplies a control voltage in conductor 73 as its output into the automatic gain control 62.

The 63 supplies the assumed eight integrator circuits 75, as well as the substitution detector 77 by conductor 78. Each of the integrators 75 is triggered by the read timing unit 69 through conductor 80, as well as the substitution detector 77 through conductor 82. The integrators 75 thus have two separate controlling inputs from conductors 85 (from the power amplifier 63) and 80 (from the timing circuit 69). The substitution detector 77 also is controlled from the same two units through conductors 78 and 82.

The eight integrators 75 supply an input to the 14 (assumed) correction networks and maximum level detector 87 through conductor 88. The unit 87 provides character output signals by conductors 90 to the latch circuits 92, which are also keyed through conductor 93 from one of the six outputs of the read timing circuit 69.

The latch circuit 92 has three separate outputs of which one is fed by conductor 94 to provide the recognized character at the output point 95. It also provides a read back to the correlation networks 87 by way of conductors 96, and a signal input through conductors 97 to the conflict detector 98. The last output of the read timing circuit provides a second input by conductor 99 to the conflict detector circuit 98.

Each of the conflict detector 98 and the substitution 77 supplies its output by conductors 101 and 102 respectively to an OR-circuit 105. If there is an output from the OR-circuit 105 it will energize the error latch 107 through conductor 108.

The automatic gain control circuitry described is depicted in more detail in FIG. 13. Here the hold input is supplied from terminal 111 and conductor 112 to the differential control circuit 113 to charge a condenser, which when it reaches a suitable voltage will energize the peak detector 116 through conductor 117 and the control voltage circuit 119 through the diode 120. One terminal of the peak detector 116 is held at the input voltage supplied to the control voltage unit 119 by connection to one of input conductors 121.

The peak detector supplies its output to terminal point 123 by conductor 124. The control voltage output is fed through conductor 127 and thence to an amplifier 129 whose gain is controlled through the FET 130. The operation was as discussed so that it may only be borne in mind that the peak of each character is normalized.

The same control voltage is also supplied to the differential control source to reset 132, it being borne in mind that this unit receives an input from the reset terminal 133 and feeds its output by way of conductor 134 to the control voltage unit 119. The other output is grounded at 135.

The amplifier 129 receives an input from terminal 133 which is usually in the range of 3 to 150 mv. When the signal through the amplifier 129 increases, the control voltage on the gate of the FET 130 increases to maintain a constant output level. The output feeds through a further lower range amplifier 138 to an output terminal 139 as well as to provide a further control on the differential control 113.

If reference is now made to FIG. 14 for a further understanding of the invention, the input signals may be regarded as having been generated from the magnetic character read head when the magnetic ink characters move relative to the pickup head and its gap to produce the signal output already mentioned as available at the terminals 19 and 20 in FIG. 1.

The signal from these terminals provides the input to the input terminal point 51 in FIG. 14*a*. In this figure the input signal is then supplied by way of a suitable conductor 52 into a preamplifier 53 which can be of any suitable type. The important factor is that a weak input signal shall be suitably amplified prior to passing through the output circuit designated at 160 into a filter 161 which rounds out the signal to a limited extent prior to passing it through a suitable conductor 56 into an automatic gain control circuit of any desired type schematically represented at 62.

The same signal which forms the output from the filter 161 is also supplied via a conductor 59 into a character peak detector 61 which serves to select those signals which are of a certain preestablished value. The output from the peak detector feeds via a conductor such as 70,72 along with the output from a suitable timing unit contained within the timing circuitry schematically represented at 69 into the automatic gain control unit already mentioned, and controls thereby the timing of its operation. The timing circuitry, such as from the unit 69 is supplied as an input 76 to a group of integrator reset elements 164, 165, 169, etc. and at the same time this output is supplied to the automatic gain control 62 by way of the connection 76.

The integrators may be controlled to store the area in each time zone, or each integrator may store the integrated area beginning at different time zones and continuing until the end of the last time zone. The area in each time zone is then derived by suitable arrangement of the correlation networks.

The outputs for the various integrator reset circuits 164. 165 through 169 are connected to the association integrator circuits schematically represented at 173, 174 through 179, for instance, of which there will be one for each time zone. The output from the automatic gain control circuits is also supplied to each of these integrator circuits. The outputs from the group of integrators as a whole feed through by the connections indicated to a complete series of correlation networks 181, 182, 183, 184 etc., of which there is one for each character.

At this point, it may be noted that many of the connections between elements, for instance, the correlation network 183, assumed to be for the character 3, and the correlation network 184, assumed to be for the character 14, are shown dashed, to indicate that there are a plurality of intervening elements, which are not shown for the sake of simplifying the drawing. Each of the correlation network elements, such as 181, 182 through 814, for instance, feeds through suitable amplifying devices, 191 through 194, all of which are similar and all of which feed into a maximum level detector unit 201 which is supplied also by way of conductor 202 with an output from the timing circuitry 69.

The maximum level detector unit has a complete series of output contact terminals, such as 210, 211, 212, and 224, one for each character so that at these output terminals a signal will be present corresponding to the recognized character.

While the invention has been described and particularly shown with reference to a preferred embodiment thereof, it will of course be understood by those skilled in the art that various changes in the form and details thereof may be made without in any respect departing from the spirit and scope of what has been hereinabove suggested.

Having now described the invention, what is claimed is:

1. A character recognition system comprising, in combination scanning means for scanning the characters to be recognized and producing an analog waveform unique for each character to be recognized, timing means connected to said scanning means and effective to generate timing signals corresponding to a plurality of time zones equal in the aggregate to the width of the characters which are scanned, a plurality of integrating means, one for each of said time zones, each having an input connected to said scanning means, each said integrating means being connected to said timing means to be effective to integrate the signal from said scanning means for at least one selected zone of said time zones, each said integrating means integrating at least one time zone not integrated by the remaining ones of said integrating means, a plurality of correlation networks commonly connected to the outputs of said integrating means, one of said networks for each of the characters to be recognized, each said network having a plurality of inputs corresponding to the number of outputs of said integrating means, each said network having a single output, and discriminator means connected to the outputs of said correlation networks and effective to provide an output indicative of which correlation network has the maximum output, thereby indicating the character which has been scanned, further including automatic gain control means connected between said scanning means and said integrating means.

2. A character recognition system comprising, in combination scanning means for scanning the characters to be recognized and producing an analog waveform unique for each character to be recognized, timing means connected to said scanning means and effective to generate timing signals corresponding to a plurality of time zones equal in the aggregate to the width of the characters which are scanned, a plurality of integrating means, one for each of said time zones, each having an input connected to said scanning means, each said integrating means being connected to said timing means to be effective to integrate the signal from said scanning means for at least one selected zone of said time zones, each said integrating means integrating at least one time zone not integrated by the remaining ones of said integrating means, a plurality of correlation networks commonly connected to the outputs of said integrating means, one of said networks for each of the characters to be recognized, each said network having a plurality of inputs corresponding to the number of outputs of said integrating means, each said network having a single output, and discriminator means connected to the outputs of said correlation networks and effective to provide an output indicative of which correlation network has the maximum output, thereby indicating the character which has been scanned, peak width detector means connected to said scanning means to determine preselected time occurrence during the scanning of a character, said detector means governing the timing means to coordinate the timing signals with a specified character scanning condition.

3. A character recognition system comprising, in combination scanning means for scanning the characters to be recognized and producing an analog waveform unique for each character to be recognized, timing means connected to said scanning means and effective to generate timing signals corresponding to a plurality of time zones equal in the aggregate to the width of the characters which are scanned, a plurality of integrating means, one for each of said time zones, each having an input connected to said scanning means, each said integrating means being connected to said timing means to be effective to integrate the signal from said scanning means for at least one selected zone of said time zones, each said integrating means integrating at least one time zone not integrated by the remaining ones of said integrating means, a plurality of correlation networks commonly connected to the outputs of said integrating means, one of said networks for each of the characters to be recognized, each said network having a plurality of inputs corresponding to the number of outputs of said integrating means, each said network having a single output, and discriminator means connected to the outputs of said correlation networks and effective to provide an output indicative of which correlation network has the maximum output, thereby indicating the character which has been scanned, each of said time zones being equivalent to the nominal width of a vertical stroke in the characters to be recognized.

4. A character recognition system comprising, in combination scanning means for scanning the characters to be recognized and producing an analog waveform unique for each character to be recognized, timing means connected to said scanning means and effective to generate timing signals corresponding to a plurality of time zones equal in the aggregate to the width of the characters which are scanned, a plurality of integrating means, one for each of said time zones, each having an input connected to said scanning means, each said integrating means being connected to said timing means to be effective to integrate the signal from said scanning means for at least one selected zone of said time zones, each said integrating means integrating at least one time zone not integrated by the remaining ones of said integrating means, a plurality of correlation networks commonly connected to the outputs of said integrating means, one of said networks for each of the characters to be recognized, each said network having a plurality of inputs corresponding to the number of outputs of said integrating means, each said network having a single output, and discriminator means connected to the outputs of said correlation networks and effective to provide an output indicative of which correlation network has the maximum output, thereby indicating the character which has been scanned, and a plurality of character storage means connected to the output of said discriminator means for storing the identity of the scanned character.

* * * * *